(12) United States Patent
Tokoro

(10) Patent No.: US 6,246,365 B1
(45) Date of Patent: Jun. 12, 2001

(54) RADAR APPARATUS

(75) Inventor: Setsuo Tokoro, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/267,642

(22) Filed: Mar. 15, 1999

(30) Foreign Application Priority Data

Apr. 2, 1998 (JP) .................................................. 10-090092

(51) Int. Cl.⁷ ...................................................... G01S 13/44
(52) U.S. Cl. .............................. 342/427; 342/74; 342/75; 342/80; 342/149; 342/195; 342/196; 342/417; 342/422
(58) Field of Search ................................. 342/73, 74, 75, 342/80, 385, 417, 422, 427, 149–154, 175, 194–197, 368–377, 29–32, 41, 70–72, 118, 128–133

(56) References Cited

U.S. PATENT DOCUMENTS

| | | | |
|---|---|---|---|
| 2,929,056 | * | 3/1960 | Page ........................................ 342/80 |
| 2,950,474 | * | 8/1960 | Page .................................... 342/80 X |
| 3,274,590 | * | 9/1966 | Page ........................................ 342/80 |
| 4,103,304 | * | 7/1978 | Burnham et al. ..................... 342/427 |
| 4,768,034 | * | 8/1988 | Preikschat et al. ..................... 342/80 |
| 5,248,984 | * | 9/1993 | Sezai ..................................... 342/427 |
| 5,600,326 | | 2/1997 | Yu et al. ................................. 342/17 |
| 6,087,974 | * | 7/2000 | Yu ...................................... 342/80 X |

FOREIGN PATENT DOCUMENTS 9-288178   11/1997 (JP) .
WO 95/04943  2/1995 (WO) .

OTHER PUBLICATIONS

Database WPI, Section PQ, Week 9803, Derwent Publications Ltd., London, Great Britain; AN 98029288 XP002900495 and abstract of JP 09 288178.
Communication dated Jul. 30, 1999 (1 page) with.
European Search Report dated Jun. 22, 1999 (2 pages).

* cited by examiner

Primary Examiner—Bernarr E. Gregory
(74) Attorney, Agent, or Firm—Finnegan, Henderson, Farabow, Garrett & Dunner, L.L.P.

(57) ABSTRACT

A radar apparatus comprising: a receiving antenna having an array antenna in which a plurality of antenna elements are arrayed in a horizontal direction; and a signal processing section for carrying out recognition of a target existing in a predetermined horizontal bearing range from receive signals received by the receiving antenna, by electrically carrying out horizontal scanning of an antenna pattern of the receiving antenna, wherein at least one of the antenna elements is placed with a shift in a vertical direction, and wherein the signal processing section detects an altitudinal bearing of the target by a monopulse method by use of a receive signal from the antenna element with the shift in the vertical direction.

6 Claims, 10 Drawing Sheets

RADAR APPARATUS

BACKGROUND OF THE INVENTION

1. Field of the Invention

The present invention relates to a radar apparatus for electrically carrying out scanning and, more particularly, to a radar apparatus suited for on-vehicle use.

2. Related Background Art

The on-vehicle radar apparatus is often utilized for recognition of cars etc. running ahead of a car and in that case, it is necessary to discriminate a preceding car from objects that cannot be obstacles because of their high altitudes from the road surface, such as road signs, information boards, and so on.

The invention to meet this demand is the on-vehicle monopulse radar apparatus for detecting a target by mechanically carrying out horizontal scanning and detecting an altitudinal bearing of the target by the monopulse method, as disclosed in Japanese Laid-open Patent Application No. 9-288178.

Since this on-vehicle monopulse radar apparatus can detect the altitudinal bearing of the target by the monopulse method, it can discriminate the cars from the road signs, information boards, etc. whose distances from the road surface are greater than those of the cars.

In this prior art, however, a plurality of receiving antennas of the mechanical scanning type are arrayed vertically, so that there are limitations on narrowing the space between the vertical receiving antennas. On the other hand, the monopulse method has a feature that the angular detection range becomes narrower as the antenna space increases. Therefore, the prior art described above had the problem that the angular range of detection in elevation was not assured sufficiently.

SUMMARY OF THE INVENTION

The radar apparatus of the present invention has been accomplished in order to solve the above problem and one thereof is a radar apparatus comprising: a receiving antenna having an array antenna in which a plurality of antenna elements are arrayed in a horizontal direction; and a signal processing section for carrying out recognition of a target existing in a predetermined horizontal bearing range from receive signals received by the receiving antenna, by electrically carrying out horizontal scanning of an antenna pattern of the receiving antenna, wherein at least one of the antenna elements is placed with a shift in a vertical direction, and wherein the signal processing section detects an altitudinal bearing of the target by a monopulse method by use of a receive signal from the antenna element with the shift in the vertical direction.

The vertical shift amount of the antenna element can be properly designed according to the purpose and there are no specific restrictions as to the arrangement on the extent of decrease of the shift amount. As this shift amount becomes smaller, the angular detection range becomes wider on in elevation.

There are a variety of vertical shift ways of the antenna elements; for example, they may be shifted alternately or only necessary antenna elements may be selectively shifted in the vertical direction.

In the case of the horizontal, electrical scanning of the antenna beam using the receive signals from the respective antenna elements, it is desirable to effect correction according to the shift amount on the receive signal from the antenna element with the shift in the vertical direction.

Another radar apparatus of the present invention is a radar apparatus comprising: a first receiving antenna having an array antenna in which a plurality of antenna elements are arrayed in a horizontal direction; a second receiving antenna having an array antenna in which a plurality of antenna elements are arrayed in a vertical direction; and a signal processing section for carrying out recognition of a target, based on receive signals from the first and second receiving antennas; wherein said signal processing section is arranged to carry out recognition of said target existing in a predetermined horizontal bearing range by electrically carrying out horizontal scanning of an antenna pattern of said first receiving antenna, to carry out recognition of said target existing in a predetermined altitudinal bearing range by electrically carrying out vertical scanning of an antenna pattern of said second receiving antenna, and, in the case of a plurality of targets being detected, to carry out identification of targets detected by the horizontal scanning and targets detected by the vertical scanning, based on intensities of receive signals.

Since this radar apparatus comprises the receiving antenna (the second receiving antenna) for vertical scanning, separate from the receiving antenna (the first receiving antenna) for horizontal scanning, the angular detection range can be set freely in elevation.

The scanning throughput is smaller and the size of the apparatus is also smaller than those of the radar apparatus for detecting the two-dimensional position of the target by using a two-dimensional array of antenna elements and electrically carrying out the vertical and horizontal scannings.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
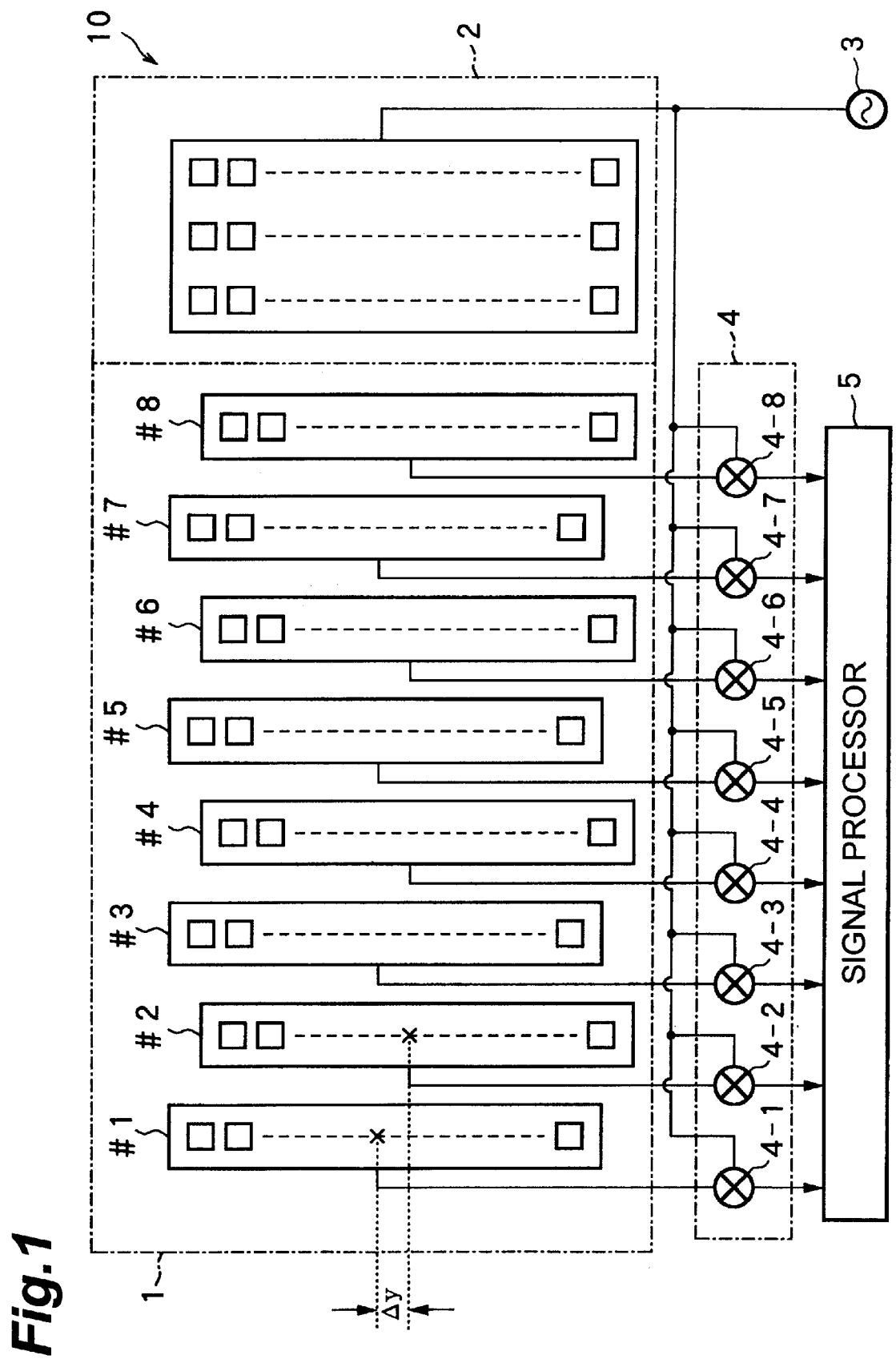
FIG. 1 is a structural diagram to show the radar apparatus as an embodiment of the present invention.

FIG. 1 is a structural diagram to show an embodiment of the radar apparatus of the present invention. This radar apparatus 10 is an FM-CW radar apparatus using a transmit signal of a frequency-modulated (FM) continuous wave (CW) and DBF radar apparatus for carrying out a digital beamforming operation in the receiving antenna. This radar apparatus 10 is a so-called on-vehicle radar apparatus to be mounted on an automobile, which detects a distance to a vehicle running ahead, relative velocity thereof, and so on. The result of detection of this radar apparatus is utilized as control information of running of vehicle or the like. The transmit radio wave is a millimeter wave.

The receiving antenna 1 is composed of eight antenna elements #1 to #8 arrayed in the lateral direction (or in the horizontal direction). Each of the antenna elements #1 to #8 has a plurality of patch antennas, the patch antennas being connected to one feeding point per antenna element so as to have substantially equal line lengths. The present embodiment is so arranged that in each antenna element the patch antennas are aligned vertically (or perpendicularly), but they may be aligned along two or more lines or in other array patterns.

Center points of the respective antenna elements are alternately shifted in the vertical direction. Specifically, the antenna elements #1, 3, 5, 7 compose a group of upper antenna elements, the antenna elements #2, 4, 6, 8 compose a group of lower antenna elements, and there is a vertical shift equivalent to the length of $\Delta y$ between the upper antenna element group and the lower antenna element group.

The transmitting antenna 2 is provided on the same plane as the receiving antenna 1 is, and is composed of a lot of patch antennas arrayed vertically and horizontally and connected to one feeding point.

Connected to this feeding point of the transmitting antenna 2 is an output terminal of voltage-controlled oscillator 3 having the center frequency of f0 (for example, 76 GHz). The voltage-controlled oscillator 3 outputs a signal resulting from triangular modulation of the frequency modulation width $\Delta F$ on the carrier wave of the frequency f$\phi$ according to a control voltage outputted from a dc power supply for modulation not illustrated, i.e., outputs a modulated wave (transmit signal) of the frequency f0$\pm\Delta F$/2, and this modulated wave is radiated as an electromagnetic wave from the transmitting antenna 2.

A mixer section 4 includes eight mixers 4-1 to 4-8 to be connected to the respective antenna elements of the receiving antenna 1. An input into each mixer is a local signal which is part of the transmit signal from the voltage-controlled oscillator 3, and the receive signals from the respective antenna elements are mixed with this local signal to be downconverted to intermediate frequencies. This downconverting operation obtains beat signals (difference signals between the transmit signal and the receive signals) in the FM-CW radar apparatus.

A signal processing section 5 performs the fast Fourier transform operation (FFT operation) and digital beamforming operation (DBF operation) with the beat signals to detect a target. In this embodiment, the distance, relative velocity, and horizontal bearing of the target are detected with horizontal scanning of the antenna beam by the DBF operation and the altitudinal angle of the target is obtained by the phase monopulse method.

Now, the triangular modulation FM-CW method applied in the present embodiment is described herein briefly. Let fr be the beat frequency at the relative velocity of zero, fd be the Doppler frequency based on the relative velocity, fb1 be the beat frequency in frequency-increasing intervals (up intervals), and fb2 be the beat frequency in frequency-decreasing intervals (down intervals). Then the following equations hold.

$$fb1 = fr - fd \quad (1)$$

$$fb2 = fr + fd \quad (2)$$

Therefore, fr and fd can be calculated from next Equations (3), (4) by separately measuring the beat frequencies fb1 and fb2 in the up and down intervals of modulation cycles.

$$fr = (fb1 + fb2)/2 \quad (3)$$

$$fd = (fb2 - fb1)/2 \quad (4)$$

Once fr and fd are obtained, the range R and velocity V of the target can be calculated according to next Equations (5), (6).

$$R = (C/(4 \cdot \Delta F \cdot fm)) \cdot fr \quad (5)$$

$$V = (C/(2 \cdot f0)) \cdot fd \quad (6)$$

In these equations, C is the speed of light and fm is the modulation frequency of FM.

Figure 2:
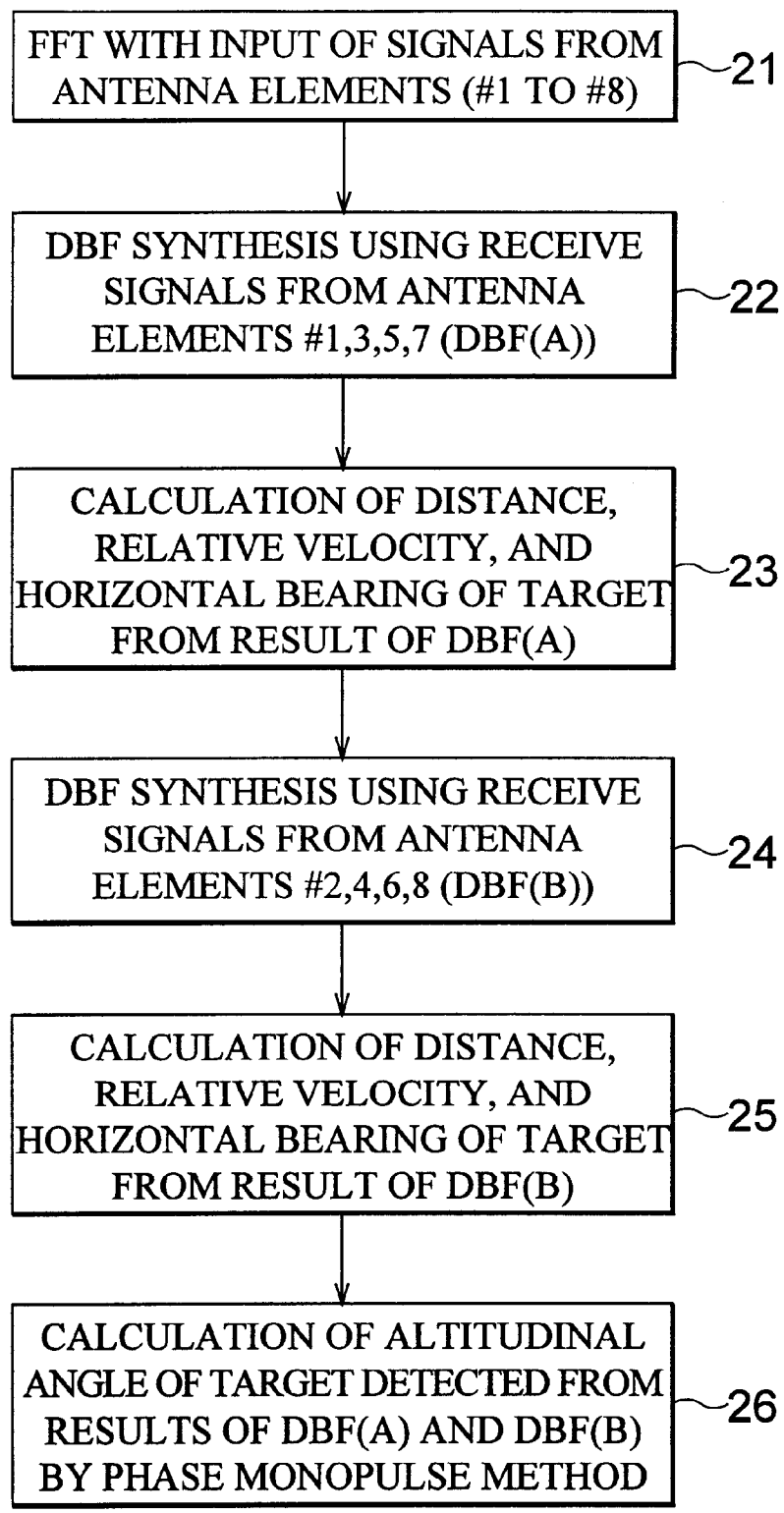
FIG. 2 is a flowchart to show the procedures of processing in the signal processing section.

In the signal processing section 5 of the present embodiment, as illustrated in the flowchart of FIG. 2, the operations of DBF synthesis and detection of target using the upper antenna elements are carried out separately from those using the lower antenna elements, and thereafter, the altitudinal angle of the target is detected by the phase monopulse method from the results of the DBF synthesis operations.

In FIG. 2, first, the FFT operation is carried out every channel with input of the beat signals of the respective antenna elements or the respective channels downconverted from the receive signals in the respective antenna elements #1 to #8 (step 21). The FFT operation herein is the complex FFT operation to detect the frequency and phase of the beat signal of each channel.

Next, the first DBF synthesis (A) is carried out using the result of the FFT operation of the beat signals from the upper antenna elements #1, 3, 5, 7. An example of the DBF synthesis (A) is beam synthesis in which the horizontal angular range of 10° on either side, totally 20°, is divided into 20 (step 22).

Then the distance, relative velocity, and horizontal bearing (angle) of target are computed from the result of the DBF synthesis (A). The distance and relative velocity in each of the twenty-divided directions can be calculated according to Eq. (5) and Eq. (6) described above (step 23).

The above has completed the detection of the target using the upper antenna elements #1, 3, 5, 7 and then the detection of the target is carried out using the lower antenna elements #2, 4, 6, 8. The detection operation is exactly the same as in the case of the upper antenna elements; the DBF synthesis is first carried out (this DBF synthesis will be called DBF synthesis (B)), and the distance, relative velocity, and horizontal bearing (angle) of the target are computed using the result (steps 24, 25).

Finally, the altitudinal angle is computed by the phase monopulse method from the results of the DBF synthesis (A) and DBF synthesis (B) (step 26). The altitudinal angle detection by the phase monopulse method may be carried out by comparison of the results of the DBF syntheses (A) and (B) for all the 20-divided bearings or for some bearings preliminarily selected. The phase monopulse operation may also be carried out only for a bearing in which a target satisfying a predetermined condition is detected.

Since the distances, relative velocities, and bearings of the target obtained in respective steps 23 and 25 must be nearly equal, the result in only either step may be employed as a final result or an average of the both results may be employed as a final result.

In order to enhance the horizontal recognition accuracy more, it can also be contemplated that step 26 is followed by an operation to cancel out the effect of the vertical shift Ay between the upper antenna elements #1, 3, 5, 7 and the lower antenna elements #2, 4, 6, 8 by signal processing using the distance and the altitudinal and horizontal directions of the target, to carry out again the DBF synthesis using all the antenna elements #1 to #8, and to employ the distance, relative velocity, and bearing based on the result thereof as a final result.

Figure 3:
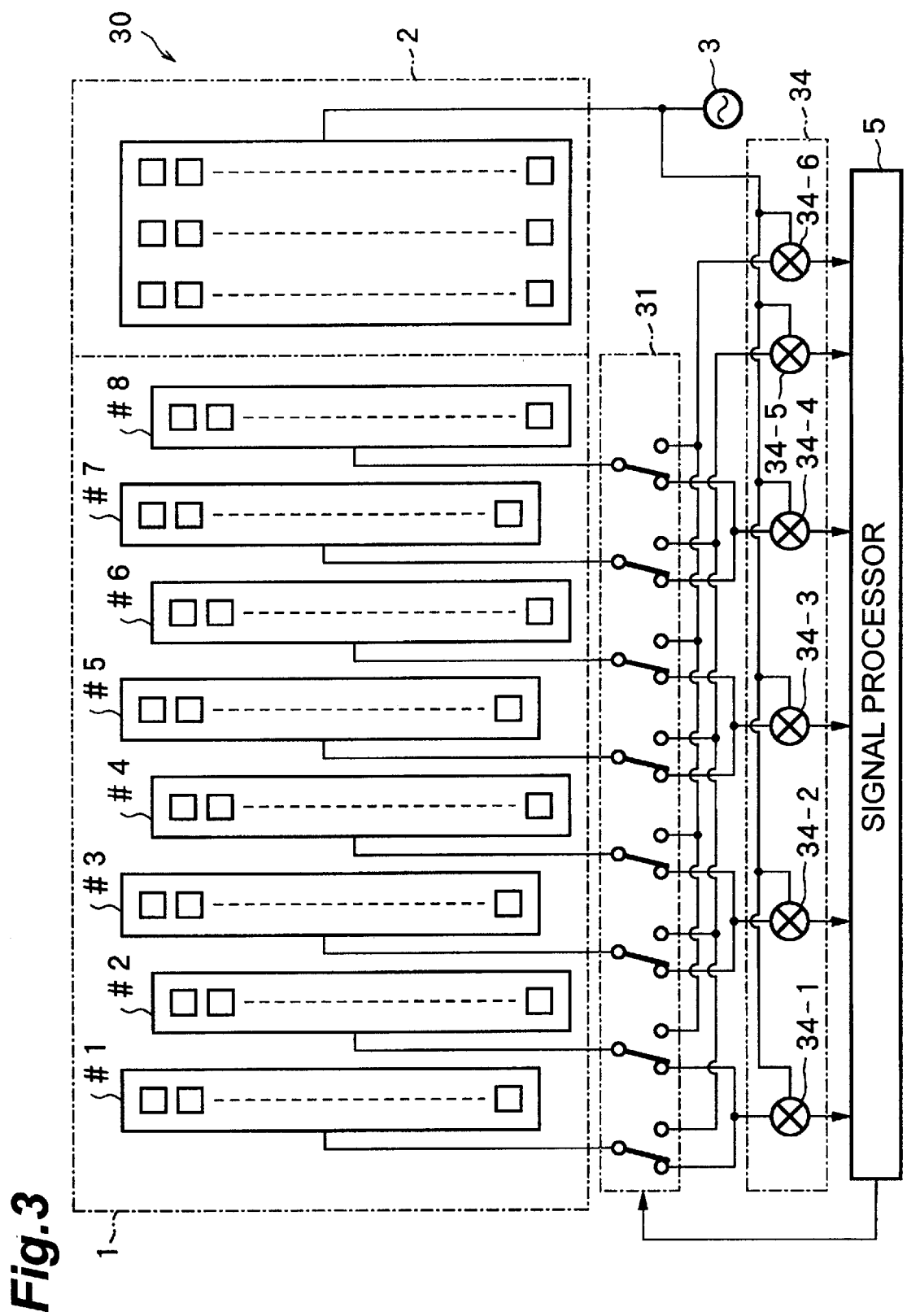
FIG. 3 is a structural diagram to show the radar apparatus as the second embodiment of the present invention.

FIG. 3 is a structural diagram to show a second embodiment of the present invention. The radar apparatus 30 of this embodiment has a switch group 31, which switches connection between each antenna element of the receiving antenna 1 and the mixer section 34 during the horizontal DBF synthesis operation to that during the altitudinal phase monopulse operation, and vice versa.

The switch group 31 has eight movable contacts respectively connected to the corresponding antenna elements #1 to #8 and sixteen fixed contacts, each two fixed contacts corresponding to one movable contact. The switch group 31 takes two switch states; the first connection state is a state in which each movable contact is connected to the left fixed contact as illustrated and the second connection state is a state in which each movable contact is connected conversely to the right fixed contact. Switching between the connection states is effected according to a signal from the signal processing section 5.

In the first connection state, the antenna elements #1 and #2, #3 and #4, #5 and #6, or #7 and #8 are connected to each other to be connected to an input terminal of each mixer 34-1 to 34-4. Therefore, the receiving antenna 1 becomes substantially an antenna of four channels in the horizontal direction. In this state, the signal processing section 5 performs the DBF synthesis using the receive signals of the four channels and computes the distance, relative velocity, and horizontal bearing (angle) of the target by use of the result of the DBF synthesis.

On the other hand, in the second connection state, the upper antenna elements #1, #3, #5, #7 are connected together to a common terminal and the lower antenna elements #2, #4, #6, #8 are connected together to a common terminal. This makes the receiving antenna 1 substantially equivalent to a configuration in which two antenna elements are arrayed up and down and the signal processing section 5 can detect the altitudinal angle of the target by the phase monopulse method using the receive signals from the respective upper and lower antenna element groups.

Figure 4:
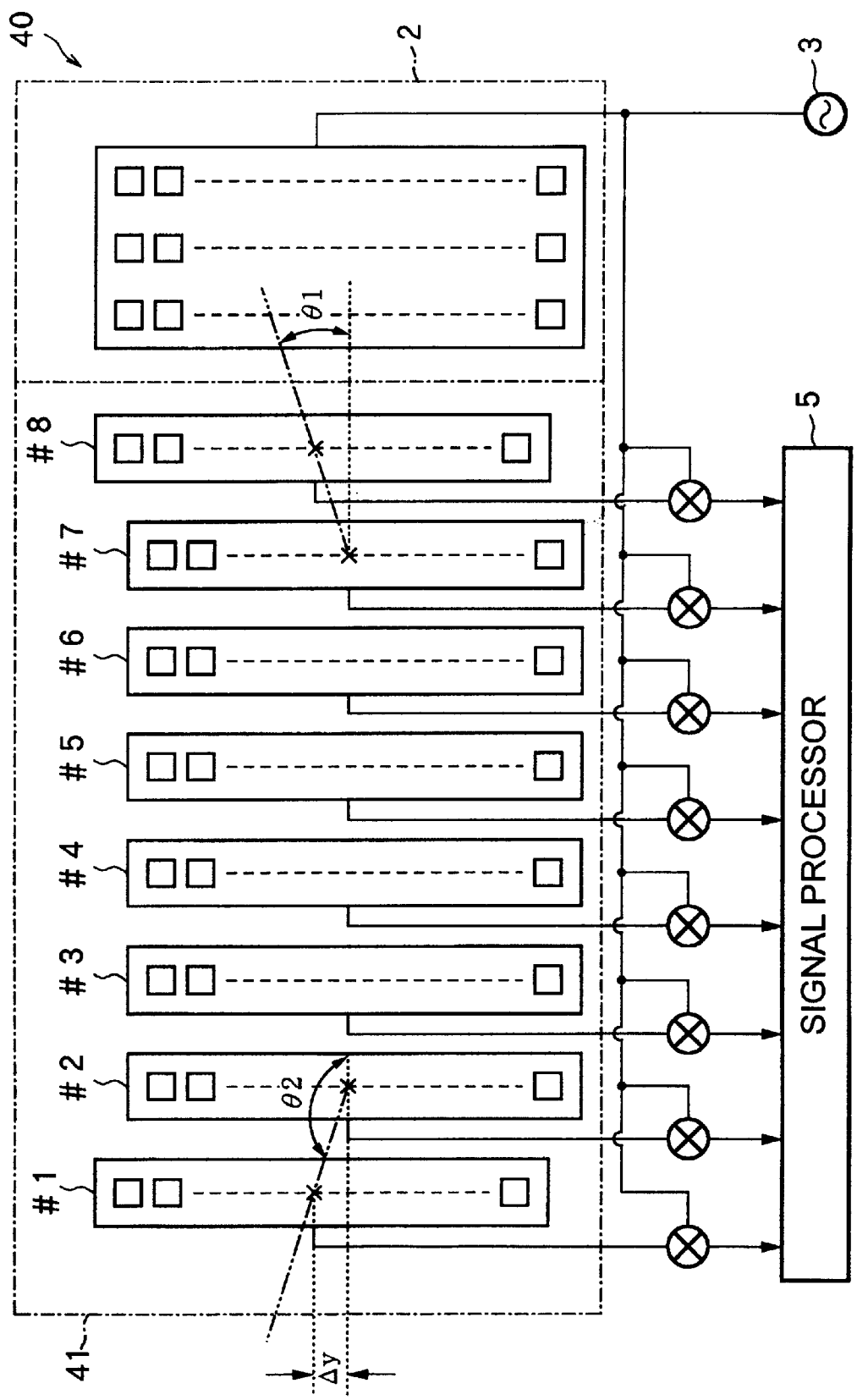
FIG. 4 is a structural diagram to show the radar apparatus as the third embodiment of the present invention.

FIG. 4 is a structural diagram to show the radar apparatus as a third embodiment of the present invention. The receiving antenna 41 is similar to the receiving antenna 1 of the first embodiment in that it is composed of eight antenna elements arrayed in the horizontal direction. The antenna elements were alternately shifted in the vertical direction in the receiving antenna 1 of the first embodiment, whereas only the antenna element #1 at the left end and the antenna element #8 at the right end are shifted up by Δy from the other antenna elements #2 to #7 in the receiving antenna 41 of this embodiment.

In this radar apparatus, the DBF synthesis is carried out in the horizontal direction using the antenna elements #1 to #8 to detect the distance, relative velocity, and horizontal bearing of the target. The apparatus is arranged to detect an angle of the target in a first oblique direction (angle θ1) by the antenna elements #7 and #8 and detect an angle of the target in a second oblique direction (angle θ2) by the antenna elements #1 and #2 each by the phase monopulse method and to obtain the altitudinal angle of the target from the two detection results.

Figure 5:
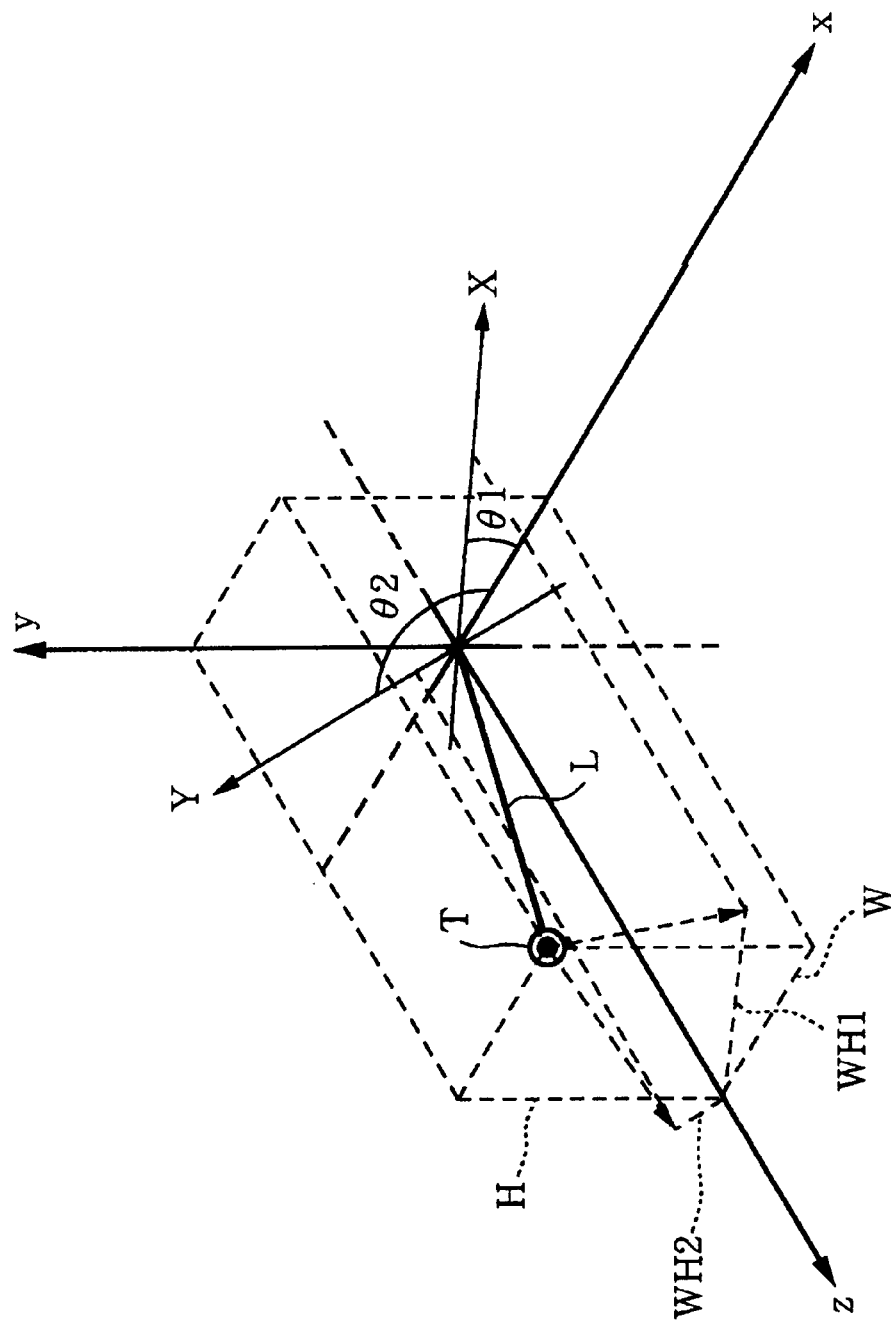
FIG. 5 is a diagram to show the position of the target in the three-dimensional space.

Next described using FIG. 5 is how to obtain the altitudinal angle of the target. FIG. 5 shows a state of the target T placed in the three-dimensional orthogonal coordinate space of x, y, and z. The x-direction corresponds to the horizontal direction of this radar apparatus 40, the y-direction to the vertical direction, and the positive direction of the z-direction to the forward direction. The first oblique direction of FIG. 4 corresponds to the X-axis on the xy plane and the second oblique direction to the Y-axis on the xy plane.

Let L be a distance to the target T, θ(X) be an angle of the target T with respect to the reference of the z-axis in the first oblique direction or the X-direction, and θ(Y) be an angle of the target T with respect to the reference of the z-axis in the second oblique direction or the Y-direction. Then displacements WH1 and WH2 of the target T in the first oblique direction and in the second oblique direction are expressed respectively by the following equations.

$$WH1 = L \times \sin \theta(X)$$

$$WH2 = L \times \sin \theta(Y) \tag{7}$$

The angles θ(X), θ(Y) in the first oblique direction and in the second oblique direction can be obtained by the phase monopulse operation and the distance L is already obtained by the horizontal DBF synthesis. Therefore, the displacements WH1 and WH2 of the target T can be calculated from above Eq. (7).

Next, the angle in the y-axis direction or the vertical direction is obtained using these displacements WH1 and WH2. Letting θ1 be the angle of the first oblique direction with respect to the x-axis and θ2 be the angle of the second oblique direction with respect to the x-axis, the horizontal position W and vertical position (height) H of the target T can be expressed as follows.

$$W = (WH1/\sin \theta1 - WH2/\sin \theta2)/(1/\tan \theta1 - 1/\tan \theta2)$$

$$H = (WH1/\cos \theta1 - WH2/\cos \theta2)/(1/\tan \theta1 - 1/\tan \theta2) \tag{8}$$

Substituting the displacements WH1 and WH2 obtained by above Eq. (7) into this equation, the horizontal position W and vertical position H of the target T can be calculated.

Once the positions W and H are obtained, the angle θy of the target T in the y-axis direction or the vertical direction can be obtained as follows.

$$\theta y = \sin^{-1}(H/L) \tag{9}$$

In this way, the angle in the vertical direction can be detected by obtaining each of the angles of the target in the first oblique direction and in the second oblique direction by the phase monopulse method.

At the same time, the angle θx of the target T in the x-axis direction or the horizontal direction can also be obtained as follows.

$$\theta x = \sin^{-1}(W/L) \tag{10}$$

Error detection in the DBF synthesis can be known by comparing the horizontal bearing of the target detected by the DBF synthesis with this θx, whereby the detection accuracy can be enhanced.

Figure 6:
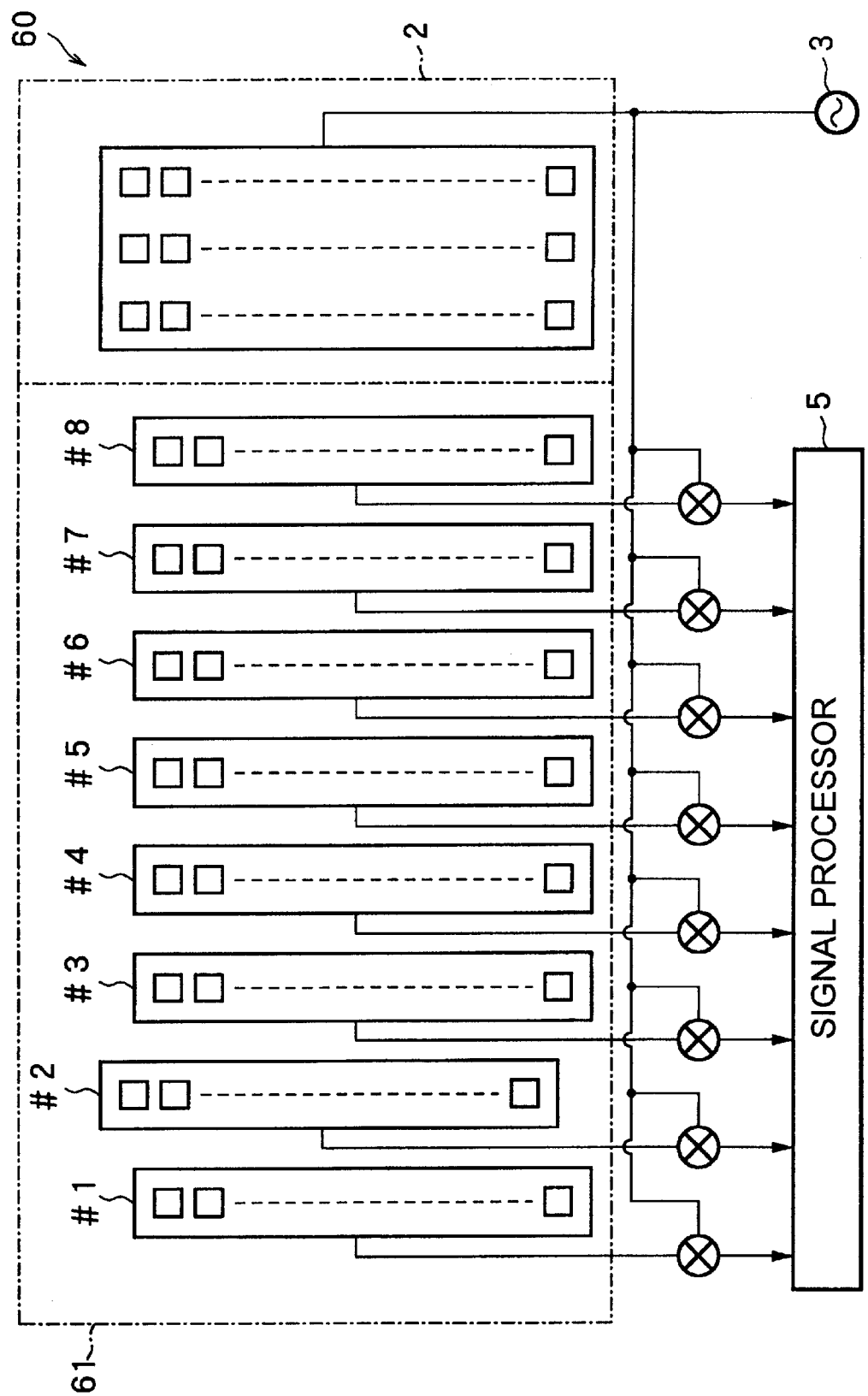
FIG. 6 is a structural diagram to show the radar apparatus as the fourth embodiment of the present invention.

FIG. 6 is a structural diagram to show the radar apparatus of a fourth embodiment of the present invention. This is different from the third embodiment in the array of antenna elements in the receiving antenna. Specifically, the two antenna elements #1 and #8 were shifted up from the other antenna elements in the third embodiment (see FIG. 4), whereas only one antenna element #2 is shifted up in this embodiment.

The horizontal DBF synthesis can be carried out using all the antenna elements #1 to #8 and the altitudinal angle can be detected by the method similar to that of the third embodiment from an angle by the phase monopulse in the first oblique direction with the antenna elements #1 and #2 and an angle by the phase monopulse in the second oblique direction with the antenna elements #2 and #3.

In the second and fourth embodiments, the phase monopulse is carried out in the two oblique directions in order to detect the altitudinal angle of the target, and the angle θ1 or θ2 of each oblique direction can be set arbitrarily; in an extreme example either one angle may be set to zero and Eqs. (7), (8), (9) may be applied. This means that when two types of phase monopulse operations are carried out, either one of them may be an operation for obtaining the angle in the horizontal direction.

It is noted in the first, third, and fourth embodiments that where the DBF synthesis is carried out including the antenna elements shifted vertically, it is necessary to take the vertical shift amount Δy of the antenna elements into consideration. In the first embodiment, for example, correction is made for the signals of the lower antenna elements #2, #4, #6, #8 so as to be matched with the upper antenna elements #1, #3, #5, #7. Then, described below is how to obtain a horizontal, electrical phase difference dφx after the correction of the vertical shift amount Δy of the antenna elements.

Let dφ be an electrical phase difference including vertical and horizontal shifts, λ be the wavelength of the transmitted wave, L be the distance to the target T, W be the horizontal position of the target T, and H be the vertical position thereof. Then a conversion factor dφy of the vertical shift Δy of the antenna elements into an electrical phase difference is obtained by the following.

$$d\phi y=(L-L(1-(2H\Delta y-\Delta y^2)/L^2)^{1/2})\times 2\pi/\lambda \approx (\Delta y(2H-\Delta y)/2L)\times 2\pi\times \lambda \quad (11)$$

Since the horizontal, electrical phase difference dφx can be approximated by the following relation:

$$d\phi x \approx d\phi - d\phi y \quad (12),$$

the DBF synthesis using this equation permits an accurate horizontal bearing to be detected using all the antenna elements even if some of the antenna elements are shifted vertically.

Figure 7:
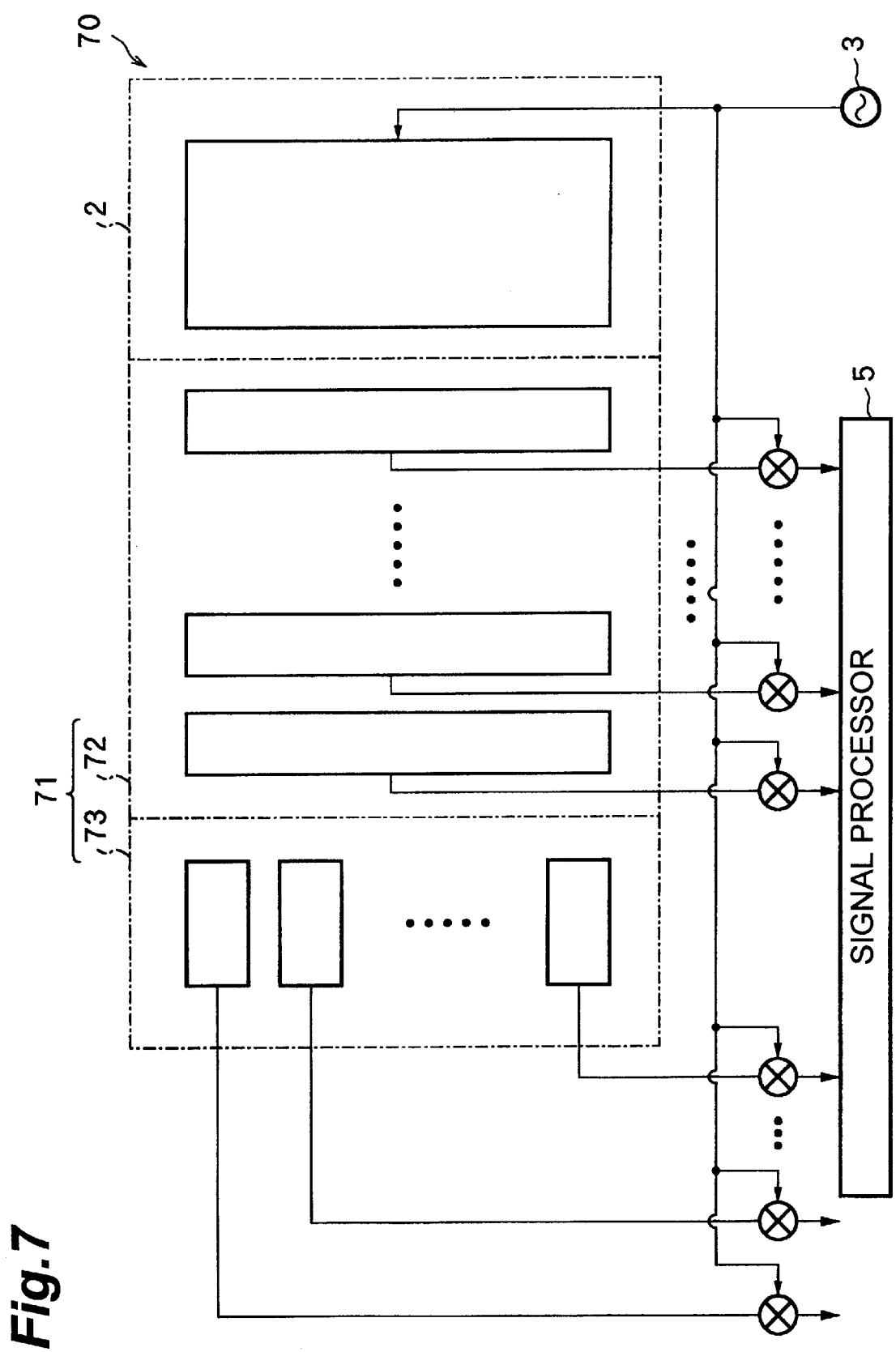
FIG. 7 is a structural diagram to show the radar apparatus as the fifth embodiment of the present invention.

FIG. 7 is a structural diagram to show the FM-CW radar apparatus of a fifth embodiment of the present invention. In this radar apparatus 70, the receiving antenna 71 consists of an antenna element group 72 arrayed in the horizontal direction and an antenna element group 73 arrayed in the vertical direction. The signal processing section 5 is arranged to perform the DBF synthesis using signals from the antenna element group 72, so as to effect the horizontal scanning of the antenna beam and to perform the DBF synthesis using signals from the antenna element group 73, so as to effect the vertical scanning of the antenna beam.

Figure 8:
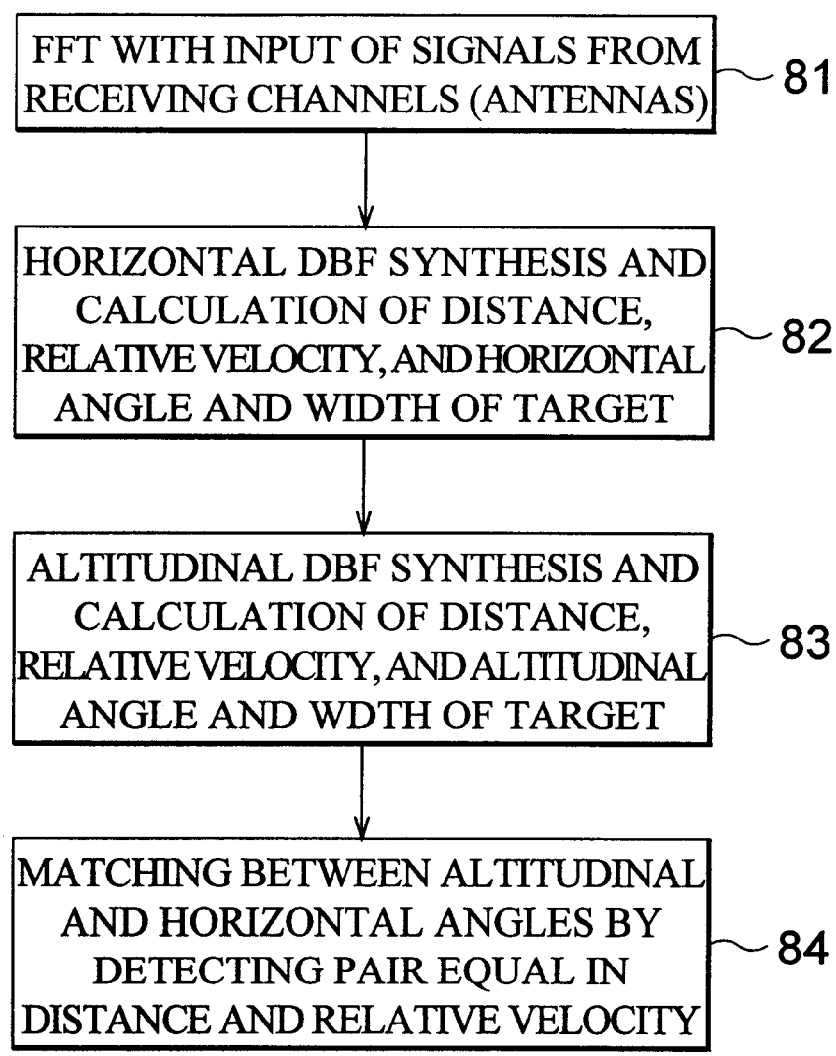
FIG. 8 is a flowchart to show the procedures of processing in the signal processing section.

FIG. 8 is a flowchart to show the procedures of processing in this signal processing section. First, the FFT operation is carried out with input of the beat signals based on the receive signals from the respective antenna elements (channels) composing the receiving antenna 71, to detect the frequency of the beat signal of each antenna element (including phase information) (step 81). Then the horizontal DBF synthesis is carried out from the frequencies of the beat signals corresponding to the respective antenna elements composing the antenna element group 72 to calculate the distance, relative velocity, and horizontal bearing (angle and width) of the target (step 82).

Then the vertical DBF synthesis is carried out from the frequencies of the beat signals corresponding to the respective antenna elements composing the antenna element group 73 to calculate the distance, relative velocity, and altitudinal bearing (angle and width) of the target (step 83).

In the last step, the distances and relative velocities are compared between the targets detected in step 82 and the targets detected in step 83 and, judging that those bearing equal both in distance and relative velocity represent an identical target, matching is made between the altitudinal and horizontal bearings of the targets (step 84).

At this time, it is not possible to make one-to-one correspondence between targets detected by the vertical scanning and targets detected by the horizontal scanning if there exist a plurality of targets equal both in distance and relative velocity in each of the vertical and horizontal directions.

Figure 9:
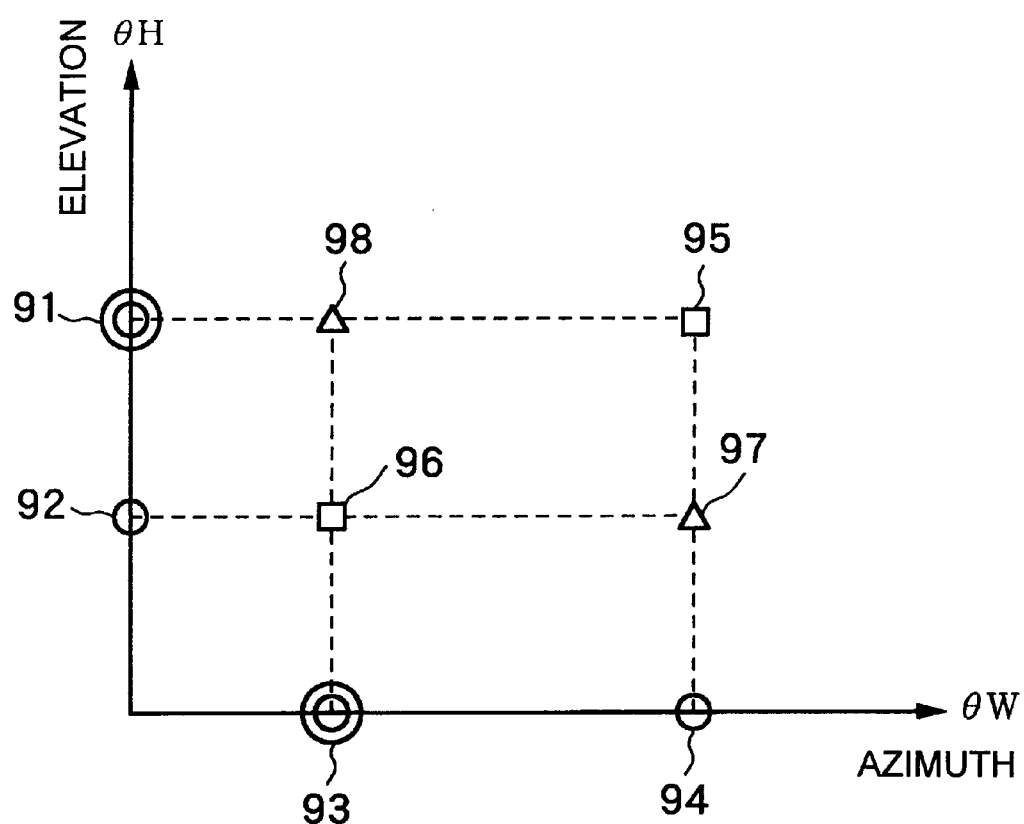
FIG. 9 is a diagram to show a situation in which there exist a plurality of targets.

FIG. 9 is a diagram to show matching where there are targets equal in distance and relative velocity, two targets detected by the vertical scanning and two targets detected by the horizontal scanning. Supposing that the targets 91 and 92 are detected in elevation, that the targets 93 and 94 are detected in azimuth, and that the distances and relative velocities of these targets all are equal, it is impossible to determine whether actual targets are located at positions 95 and 96 or at positions 97 and 98 in the two-dimensional space of the vertical and horizontal directions.

Figure 10:
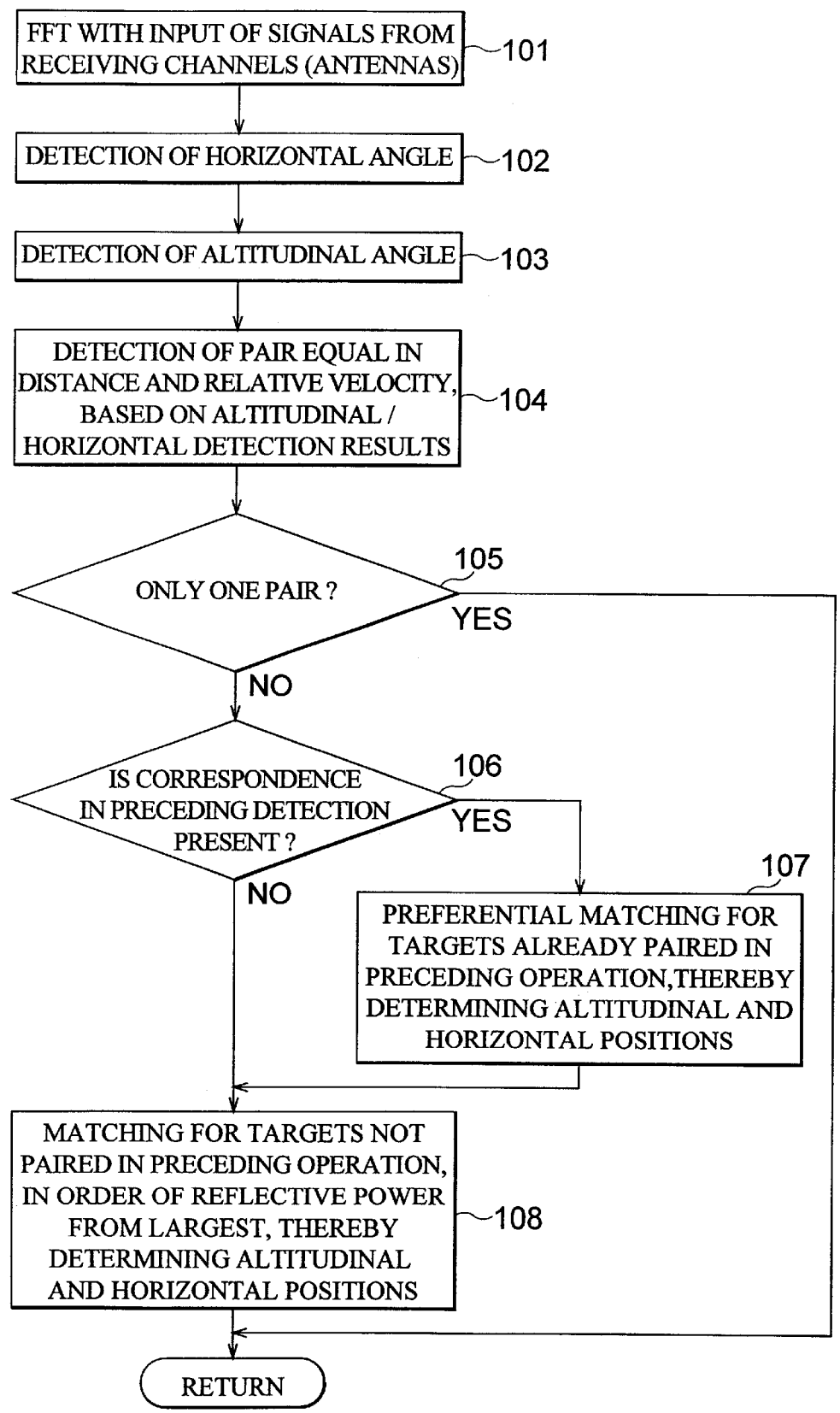
FIG. 10 is a flowchart to show the detailed processing procedures in the signal processing section.

The present embodiment is thus arranged to achieve the matching by use of reflective power in such cases. FIG. 10 is a flowchart of the signal processing section 5 to clearly show this point and is a more detailed illustration of the flowchart of FIG. 8.

The FFT operation is carried out with input of the beat signals obtained by downconverting the signals received by the respective antenna elements (step 101). Then performed are the horizontal angle detection and vertical angle detection based on the DBF synthesis (steps 102, 103).

Next, based on the vertical and horizontal detection results, each pair having the same distance and relative velocity is detected (step 104) and it is determined whether there is only one pair (step 105).

When there is only one pair, the pairing is definite and the flow returns to step 101. If there are two or more pairs, as illustrated in FIG. 9, consideration is first given to correspondence to the detection result in the preceding operation (step 106).

Now, assuming the present operation is the first operation, the flow moves to step 108, because there is no preceding operation result. Step 108 is to perform matching or pairing in order from the largest reflective power to finally determine combinations in azimuth and elevation. In the example of FIG. 9, in elevation the reflective power of detection target 91 is greater than that of detection target 92 and in azimuth the reflective power of detection target 93 is greater than that of detection target 94. When the pairing is carried out in order from the largest reflective power, the altitudinal detection target 91 is matched with the horizontal detection target 93 and the altitudinal detection target 92 is matched with the horizontal detection target 94. Namely, the altitudinal and horizontal positions of the targets in the two-dimensional space are determined as positions 98, 97.

In the determination step 106, when there is the result of the preceding operation, the flow moves to step 107 to effect preferential matching of targets that were already matched with each other in the preceding operation, thereby determining the altitudinal and horizontal positions of the targets in the two-dimensional space.

After that, the flow goes to step 108 to perform matching for targets that were not matched in the preceding operation, in the descending order of reflective power, thereby determining the altitudinal and horizontal positions of the targets in the two-dimensional space.

The above operation makes it possible to pair the targets in azimuth and elevation and to detect the altitudinal and horizontal bearings of the targets in the two-dimensional space even if a plurality of targets having the same distance and relative velocity are detected in the vertical and horizontal directions.

In cases where high resolving power is not required in the vertical direction, the antenna element group 73 may be composed of only two antenna elements arrayed up and down. In such cases, the altitudinal angle is detected by the phase monopulse.

As described above, the radar apparatus of the present invention can detect the altitudinal bearing of the target in the desired angular range, by vertically shifting part of the plural antenna elements composing the receiving antenna and arrayed horizontally or by providing the antenna elements arrayed vertically, separate from the antenna elements arrayed horizontally. Namely, the angular range of detection in elevation can be sufficiently wide, because the vertical shift amount or the vertical array space can be set as small as occasion may demand.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A radar apparatus comprising:
   a receiving antenna having an array antenna wherein a plurality of antenna elements are arrayed in a horizontal direction; and
   a signal processing section for recognizing a target existing in a predetermined bearing range from signals received by the receiving antenna, by a horizontal scan of an antenna pattern of the receiving antenna,
   wherein at least one of said antenna elements is shifted in a vertical direction, and
   wherein said signal processing section detects a bearing of said target by use of a signal received by said at least one antenna element shifted in the vertical direction.

2. The radar apparatus according to claim 1, wherein said antenna elements are arrayed as alternately shifted up and down and said signal processing section detects the altitudinal bearing of said target by the monopulse method from a result of synthesis of signals received by an upper antenna element group and a result of synthesis of signals received by a lower antenna element group.

3. The radar apparatus according to claim 1, wherein said signal processing section performs an operation for canceling out the shift amount of the antenna element, on the signal from the antenna element with the shift in the vertical direction, on the occasion of horizontal scanning of the antenna pattern.

4. The radar apparatus according to claim 1, wherein said signal processing section is arranged to detect a bearing of said target by the monopulse method by use of signals from a set of antenna elements placed as shifted up and down, to detect a bearing of said target by the monopulse method by use of signals from another set of antenna elements, and to calculate an altitudinal angle of said target by canceling out a horizontal angle of said target from results of the both detections.

5. A radar apparatus comprising:
   a first receiving antenna having an array antenna wherein a plurality of antenna elements are arrayed in a horizontal direction;
   a second receiving antenna having an array antenna wherein a plurality of antenna elements are arrayed in a vertical direction; and
   a signal processing section for recognizing a target, based on receive signals from the first and second receiving antennas;
   wherein said signal processing section recognizes said target existing in a predetermined horizontal bearing range by electrically carrying out horizontal scanning of an antenna pattern of said first receiving antenna, to recognize said target existing in a predetermined bearing range by vertical scanning an antenna pattern of said second receiving antenna, and, in the case of a plurality of targets being detected, to identify targets detected by the horizontal scan and targets detected by the vertical scan, based on intensities of the receive signals.

6. The radar apparatus according to claim 5, wherein said signal processing section, in the case of a plurality of targets being detected, identifies the targets detected by the horizontal scanning and the targets detected by the vertical scanning, based on distances or velocities, and, in the case of a plurality of targets having substantially equal distances or velocities, identifies based on the intensities of the receive signals.

* * * * *